June 17, 1952  M. M. BARTON  2,600,958

MOLDING APPARATUS

Filed Aug. 19, 1947

INVENTOR.
MURRAY M. BARTON

BY Blair, Curtis & Hayward
ATTORNEYS.

Patented June 17, 1952

2,600,958

UNITED STATES PATENT OFFICE 2,600,958

MOLDING APPARATUS

Murray M. Barton, Wichita, Kans., assignor to Consolidated Equipment Co., Wichita, Kans., a corporation of Kansas Application August 19, 1947, Serial No. 769,360

5 Claims. (Cl. 18—30)

This invention relates to apparatus for the molding of plastic materials. More particularly it relates to simplified apparatus for the injection molding of small articles from thermoplastic materials.

Much equipment nicely suited to high speed quantity production of plastic articles has been developed heretofore and is in wide use, but such apparatus has been limited insofar as concerns its scope of application and generally has been so complex in character, expensive to purchase, and has required such skillful operators that it has been unsuitable for small quantity production applications or for use in the home workshop.

In order successfully to mold thermoplastic material, the sections of the mold must be held rigidly together and the thermoplastic material must be extruded into the mold under relatively high pressures. These high pressures have necessitated the use of inconvenient mechanical clamps on the sections of the mold. In addition, a force multiplying system, such as a system of levers, is necessary for applying molding pressures to the plastic material to cause it to flow into and fill the mold, and if the utility of the system is limited to the molding of plastics, the over-all cost is increased so that many prospective users are unable or unwilling to make the necessary investment.

In accordance with the present invention an injection molding machine is provided which is so simple in construction and so easily operated as to make it a thoroughly practical addition to the home workshop where it may be operated as a hobby, used by children in the molding of small objects, or used commercially where limited production at low cost is desired.

It is accordingly an object of this invention to provide a unitary assembly for holding and processing thermoplastic materials and which may be used in conjunction with a conventional press for the molding of small articles.

It is another object to provide an assembly for the molding of plastic articles that is simple, economical to construct, practical, and convenient to use.

Still another object is to provide a molding apparatus wherein a single member is provided through which all movements of the apparatus, force on the plastic material, and die clamping force are transferred.

A still further objective resides in the provision of molding apparatus in which no extra clamping structure for pressing together the sections of the mold is required and in which force is provided through a single member to apply pressure to the thermoplastic material.

An additional object of this invention is the provision of a self-centering mold assembly in which the nozzle of the injection apparatus automatically seats and seals itself and applies pressure for forcing the sections of the mold together.

Other objects and advantages will in part be pointed out as the description proceeds and will in part become apparent therefrom.

The invention accordingly consists in the features of construction, combinations of elements, and arrangements of parts as will be exemplified in the structures to be hereinafter indicated and the scope of the application of which will be set forth in the following claims.

In this specification and the accompanying drawings there is shown and described a preferred embodiment of the invention; but it is to be understood that such is not intended to be exhaustive nor limiting of the invention but on the contrary is given for purposes of illustration in order that others skilled in the art may fully understand the invention and the principles thereof and the manner of applying it in practical use so that they may modify and adapt it in various detailed forms, each as may be best suited to the conditions of a particular use. In the drawings.

Figure 1:
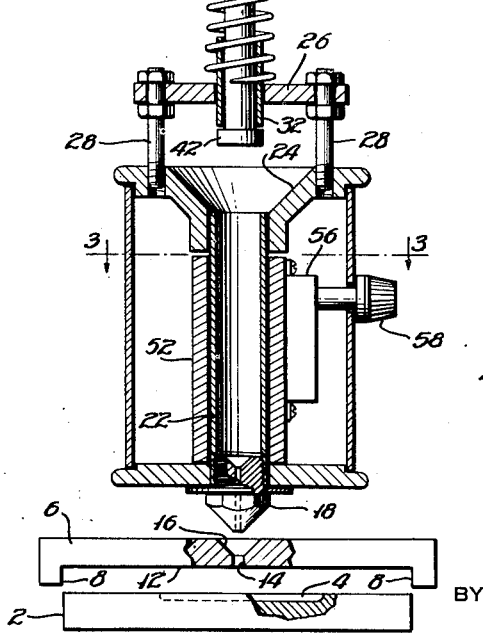
Figure 1 shows a cross-sectional view of an injection assembly constructed in accordance with the present invention.
Figure 3:
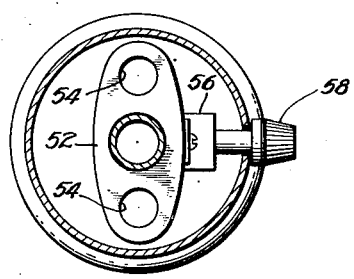
Figure 3 is a cross-sectional view taken on line 3—3 of Figure 1.
Figure 4:
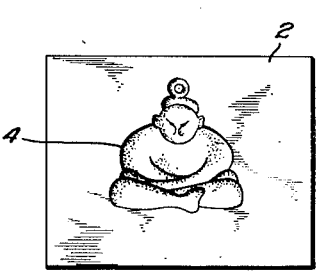
Figure 4 is a plan view of the die shown in Figure 1.

In order to avoid the necessity for die clamping members, a die 2 (see Figures 1 and 4) having a die cavity 4 of any desired pattern in its upper face is utilized in a horizontal position with an adapter plate 6 overlying the die. The adapter plate is provided with downwardly extending edge portions 8 which fit snugly against the sides of the die, thus holding the adapter plate firmly in position. In this example the under surface of the adapter plate, as at 12, has a smooth surface which forms one side of mold cavity 4.

In order to permit the flow of plastic material into the mold cavity, a vertical opening 14 is provided in adapter plate 6. The upper portion of opening 14 is conically shaped with outwardly flared walls, as at 16, into which the complementary surface of an extrusion nozzle 18 is adapted to fit.

Nozzle 18, provided with a small vertical central opening the upper portion of which is outwardly flared, is in threaded engagement with a barrel or cylinder 22 which holds the chips of thermoplastic material while they are being softened by the application of heat.

A funnel-shaped hopper 24 is secured to the upper end of cylinder 22 to facilitate feeding of the plastic chips into the cylinder. Hopper 24 is supported from a frame 26 by suitable means, as for example, two stud bolts 28.

Frame 26 supports at its center a vertical bushing 32 into which a supporting plunger 34 is slidably fitted. This plunger is surrounded by a tapered helical spring 36 which is held in compression between frame 26 and a cross-pin 38 through plunger 34. The upward motion of plunger 34 with respect to frame 26 is limited by the shoulder of an enlarged piston head 42, on the lower end of plunger 34, which shoulder strikes the lower end of bushing 32.

In order to heat the chips of thermoplastic material within cylinder 22, a block 52 of aluminum or other material having good heat conductivity is disposed with a slip fit around cylinder 22. Conventional cartridge type heating elements (not shown) are inserted in suitable openings as at 54, in block 52. In order to regulate automatically the temperature of the plastic material, a conventional type thermostat 56, the operating range of which is adjustable by means of a control knob 58 is secured to one face of the aluminum block and controls the flow of current to the cartridge heating elements.

Figure 2:
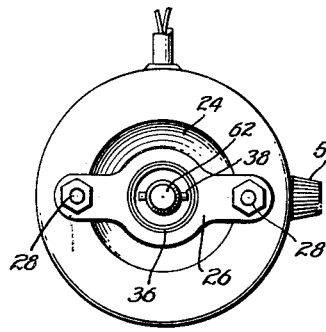
Figure 2 is a plan view of the assembly shown in Figure 1 taken along the line 2—2 thereof.
Figure 5:
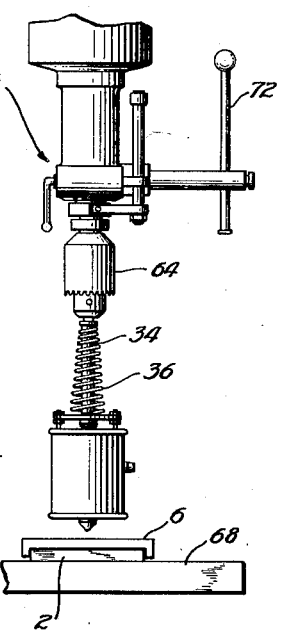
Figure 5 shows the assembly mounted in a conventional drill press in position to perform the molding operation; and, Figure 6 shows the same assembly at the moment of completion of the extruding operation.
Figure 6:
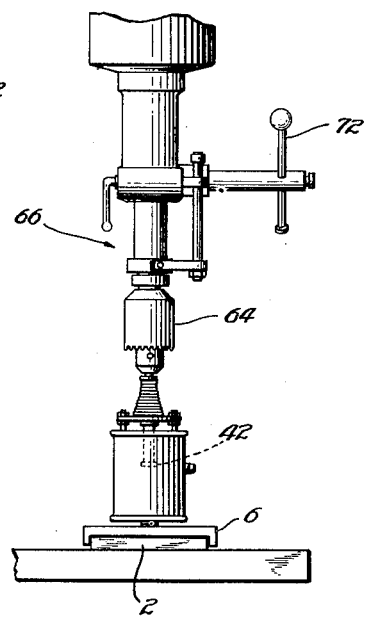

In order that the molding equipment may have maximum utility and that it may be included in a home workshop without the necessity of obtaining additional leverage systems, the unit shown in this example is adapted to be incorporated into and used with the leverage system of a conventional type drill press. To this end the upper portion of plunger 34 is provided with a cylindrical extension 62 of such diameter that it may be gripped readily by a chuck 64 (see Figures 5 and 6) of a drill press, generally indicated at 66.

In operation, the entire injection assembly is supported from chuck 64 by securing the upper portion 62 of plunger 34 therein. Table 68 of the drill press is tightened in a suitably adjusted position below the injection assembly. Die 2 is placed on the upper surface of the table directly beneath extrusion nozzle 18. Adapter plate 6 is then placed over die 2, proper centering being assured by overlapping edge portions 8.

Small chips of suitable thermoplastic material of which the extrusion is to be made are then poured into hopper 24 and the heating elements are connected to a suitable source of electrical energy. After the elapse of sufficient time to enable the plastic material in cylinder 22 to become properly softened, feed arm 72 of the drill press is rotated in such a direction as to lower the entire injection assembly. As this assembly is lowered the lower portion of extrusion nozzle 18 makes contact with the flared walls 16 of adapter plate 6. If the adapter plate and die assembly are not aligned precisely, the tapered nozzle and flared walls 16 will coact to move the die assembly into the proper position. Up to this point in the downward movement of the injection assembly there has been no movement of plunger 34 relative to frame 26 or cylinder 22. However, when further downward movement of the entire assembly is prevented by nozzle 18 coming into contact with adapter plate 6, further movement of chuck 64 moves plunger 34 downwardly through the hopper and into cylinder 22, where it acts as a piston to force the softened plastic material through the openings in the nozzle and adapter plate and into the mold cavity. During this operation spring 36 is compressed so that after sufficient pressure has been applied to accomplish the extrusion and feed arm 72 is rotated in the opposite direction, spring 36 acts to remove the plunger from the cylinder. Further upward movement of chuck 64 lifts the entire assembly into its former position.

Many novelties and decorative items may thus be molded. Preferably the objects molded should have a smooth face opposite the face having the desired design. Utmost economy is achieved by engraving a number of single element dies, each with a desired pattern, and using the same adapter plate with each of the dies. For other applications, the under side of the adapter plate may be engraved to conform with the desired pattern in the die plate, thus providing for the molding of more complex configurations. With this latter arrangement an individual adapter plate ordinarily will be required with each die, whereas in the former arrangement a single adapter plate can be used with many different engraved dies.

It is thus seen that in accordance with the present invention an extremely simple injection molding machine has been provided which advantageously may be purchased without a leverage system of its own so that those individuals having drill presses or other leverage systems may conveniently adapt them for the molding of plastic materials at a minimum expense.

From the foregoing it will be observed that injection molding apparatus embodying my invention is well adapted to attain the ends and objects hereinbefore set forth and to be economically manufactured, the separate features being well suited to common production methods and subject to a variety of modifications as may be desirable in adapting the invention to different applications.

As many possible embodiments may be made of the above invention and as many changes might be made in the embodiment set forth, it is to be understood that all matter hereinbefore set forth or shown in the accompanying drawings is to be interpreted as illustrative and not in a limiting sense.

What is claimed is:

1. A unitary hopper and heat processing assembly for use in conjunction with a mold having an internal cavity for receiving plastic material and a drill press having a table, a vertically movable chuck, and a lever system for applying downward force to said chuck; said assembly being useful for molding small articles from heat softenable material and comprising: a supporting member adapted to be releasably clamped in and extend downwardly from said chuck, a frame normally supported by and vertically movable with and with respect to said supporting member surrounding said supporting member, a spring member biasing said frame downwardly with respect to said supporting member to provide closing force for the mold to prevent leakage, a barrel secured to said frame and including a chamber for heat softenable material, a heating element supported by said frame and cooperating with said barrel to heat said softenable material, a thermostat associated with the barrel and controlling the heating of said element, an extrusion nozzle secured to said barrel for guiding and restricting the flow of said softenable material therefrom, and a plunger portion connected to said supporting member and movable into said chamber as a piston to extrude material through said nozzle; whereby under a first condition of operation said unitary assembly is supported in the drill press entirely by the vertically movable chuck, and under a second condition of operation said chuck moves said supporting member and unitary assembly downwardly in unison until such motion is prevented by contact between the lower portion of said assembly and said table, whereupon continued downward movement of said chuck causes said plunger portion to move downwardly relative to said barrel thereby extruding said softenable material through said nozzle.

2. A unitary hopper and heat processing assembly for use in conjunction with a drill press having a table, a vertically movable chuck, and a lever system for applying downward force to said chuck; said assembly being useful for molding small articles from heat softenable material and comprising: a plunger adapted to be releasably supported by said chuck and to extend downwardly therefrom, a frame slidably connected to said plunger, a spring surrounding said plunger urging said frame downwardly with respect to said plunger, and yieldably resisting sliding movements therebetween, a stop member limiting downward spring movement of said frame relative to said plunger, a cylinder supported by said frame and having an interior shape complementary to the shape of said plunger and coaxially disposed with respect thereto so that as said plunger moves downwardly into said cylinder pressure may be applied to softenable material therein, a funnel-shaped hopper extending upwardly from said cylinder to direct softenable material thereinto, a cylinder heating element supported by said frame for heating said softenable material, and an extrusion nozzle extending downwardly from said cylinder for guiding and restricting the flow of said softenable material therefrom; whereby a first downward force by said chuck upon said plunger causes initial downward movement of said assembly as a whole until such movement is prevented by contact with said table, and thereafter further downward force, dependent upon the yieldability of said spring, causes further downward movement of said chuck to cause said plunger to extrude softenable material from said cylinder.

3. A unitary heat processing and extruding assembly, for use in conjunction with a mold having an internal cavity for receiving plastic material and a press including a fixed base plate and vertically movable chuck mounted above said plate, for the molding of small objects from thermoplastic material, comprising: a plunger having an upper portion adapted to be clamped in said chuck and a lower cylindrically-shaped piston portion, a frame slidably connected to said plunger, a spring surrounding said plunger urging said frame downwardly with respect to said plunger to provide closing force for the mold, a stop portion for limiting the maximum downward movement of said frame relative to said plunger, a vertically extending cylinder below said plunger and supported by said frame and adapted to cooperate with said plunger to apply pressure to material in said cylinder, a block having high heat conductivity surrounding at least a portion of said cylinder, a heating element disposed to heat said block and said cylinder, a thermostat responsive to temperature changes in said block controlling the electrical current in said heating element, and a nozzle in the bottom of said cylinder having a restricted passageway therethrough and a conically-tapered outer surface; said assembly being supported entirely by said chuck under an initial condition of operation and upon downward movement of said chuck being placed in compression between said base plate and said chuck to cause said plunger to move downwardly in said cylinder and to extrude plastic material through said opening.

4. Apparatus for injection molding of thermoplastic material comprising: a rigidly supported table; a mold supported by said table and having an upper opening; a vertically movable chuck above and spaced from said table; a unitary processing assembly supported from said chuck and including a supporting plunger secured to said chuck, a supporting frame slidably positioned on said plunger, a spring urging said supporting frame downwardly relative to said plunger to provide closing force for the mold, a cylinder in said frame for holding thermoplastic material prior to the extrusion operation, a heating element cooperating with said cylinder for heating the thermoplastic material therein, and a nozzle secured to the lower end of said cylinder for guiding and restricting the flow of thermoplastic material therefrom; said nozzle being adapted to fit within said mold opening; and a lever system for moving said chuck and unitary processing assembly downwardly thus causing said nozzle to contact the upper opening of said mold; whereby further downward movement of said chuck compresses said spring and moves said plunger downwardly relative to said frame and said plunger enters said cylinder to extrude plastic material therefrom through said nozzle and into said mold.

5. Apparatus for the molding of small articles from thermoplastic material comprising: a press having an adjustable table; a vertically novable chuck; a lever system for moving said chuck; a unitary injection assembly supported releasably and entirely by said chuck, said assembly including a plunger releasably secured to said chuck for applying pressure to said thermoplastic material, a supporting frame secured to said plunger, a spring surrounding said plunger, controlling the relative positions of said plunger and said frame, a cylinder for holding plastic material prior to molding, a hopper connected to said cylinder for feeding thermoplastic material thereinto, a block having high heat conductivity surrounding said cylinder, an electrical heating element in said block, a thermostatic control for said heating element secured to said block, and an extrusion nozzle on said cylinder; and a mold supported by said table, said mold comprising a lower portion and an upper portion extending thereover; whereby as said chuck is moved downwardly said entire unitary assembly moves downwardly until said nozzle contacts said upper portion of said mold, and whereby further downward force on said chuck acts to press together the two portions of the mold and to force said plunger into said cylinder and apply pressure to the thermoplastic material therein to extrude the plastic material from said nozzle and into said mold.

MURRAY M. BARTON.

REFERENCES CITED

The following references are of record in the file of this patent:

UNITED STATES PATENTS

| Number | Name | Date |
|---|---|---|
| 1,810,126 | Buchholz | June 16, 1931 |
| 2,227,966 | Emsley | Jan. 7, 1941 |
| 2,404,559 | Ashbaugh | July 23, 1946 |
| 2,416,349 | Renier | Feb. 25, 1947 |
| 2,416,451 | Magnus | Feb. 25, 1947 |

FOREIGN PATENTS

| Number | Country | Date |
|---|---|---|
| 350,810 | Great Britain | June 18, 1931 |
| 654,174 | Germany | Dec. 11, 1937 |
| 699,080 | Germany | Nov. 22, 1940 |